(12) United States Patent
Liu et al.

(10) Patent No.: US 12,545,443 B2
(45) Date of Patent: Feb. 10, 2026

(54) METHOD FOR CORRECTING ORBIT ERROR OF COMMON-VIEW TIME COMPARISON OF SPACE STATION

(71) Applicant: NATIONAL TIME SERVICE CENTER, THE CHINESE ACADEMY OF SCIENCES, Shaanxi (CN)

(72) Inventors: Yinhua Liu, Shaanxi (CN); Xiaohui Li, Shaanxi (CN); Ya Liu, Shaanxi (CN); Shougang Zhang, Shaanxi (CN)

(73) Assignee: NATIONAL TIME SERVICE CENTER, THE CHINESE ACADEMY OF SCIENCES, Shaanxi (CN)

( * ) Notice: Subject to any disclaimer, the term of this patent is extended or adjusted under 35 U.S.C. 154(b) by 185 days.

(21) Appl. No.: 18/569,119

(22) PCT Filed: Sep. 19, 2022

(86) PCT No.: PCT/CN2022/119617
§ 371 (c)(1),
(2) Date: Dec. 11, 2023

(87) PCT Pub. No.: WO2023/061155
PCT Pub. Date: Apr. 20, 2023

(65) Prior Publication Data
US 2024/0278942 A1    Aug. 22, 2024

(30) Foreign Application Priority Data
Oct. 14, 2021    (CN) .......................... 202111200206.5

(51) Int. Cl.
*B64G 3/00*    (2006.01)

(52) U.S. Cl.
CPC .................................... *B64G 3/00* (2013.01)

(58) Field of Classification Search
CPC .................................. B64G 3/00; Y02A 90/10
See application file for complete search history.

(56) References Cited

U.S. PATENT DOCUMENTS

| 4,730,797 | A | * | 3/1988 | Minovitch | ............. | B64G 99/00 |
| | | | | | | 244/158.3 |
| 5,347,285 | A | * | 9/1994 | MacDoran | ............. | G01S 19/35 |
| | | | | | | 342/463 |

(Continued)

FOREIGN PATENT DOCUMENTS

| CN | 102298151 | A | * | 12/2011 |
| CN | 107579794 | A | * | 1/2018 |

(Continued)

*Primary Examiner* — Donald J Wallace
*Assistant Examiner* — Jalal C Coduroglu
(74) *Attorney, Agent, or Firm* — James W. Huffman; Huffman Law Group, PC

(57) ABSTRACT

A method for correcting an orbit error of common-view time comparison of a space station, comprising five parts, i.e., determination of moments when two stations can simultaneously view the space station, calculation of projection coefficients of the orbit error, calculation of a three-dimensional orbit error vector set, calculation of a set of projection differences of the orbit error in line-of-sight directions of the two stations, and threshold decision. By means of calculation of the five parts, the maximum influence quantity of the orbit error on a common-view time comparison result is obtained, observation moments with the maximum influence quantity exceeding a decision threshold are eliminated, and observation points with the influence of the orbit error on the common-view time comparison less than the decision threshold are reserved.

6 Claims, 4 Drawing Sheets

(56) References Cited

U.S. PATENT DOCUMENTS

| | | | | |
|---|---|---|---|---|
| 7,392,964 | B1* | 7/2008 | Anderman | B64G 1/2427 |
| | | | | 244/172.4 |
| 11,096,188 | B1* | 8/2021 | Vasisht | H04B 7/195 |
| 2004/0140930 | A1* | 7/2004 | Harles | G01S 13/46 |
| | | | | 342/465 |
| 2009/0302166 | A1* | 12/2009 | Meyers | B64G 1/4021 |
| | | | | 244/158.9 |
| 2014/0246543 | A1* | 9/2014 | Andoh | B64G 1/26 |
| | | | | 244/169 |
| 2014/0295770 | A1* | 10/2014 | Song | H04W 36/0088 |
| | | | | 455/67.11 |
| 2022/0307933 | A1* | 9/2022 | Song | G01L 25/00 |

FOREIGN PATENT DOCUMENTS

| | | | | | |
|---|---|---|---|---|---|
| CN | 108983590 | B | * | 8/2020 | H04J 3/0644 |
| CN | 109660299 | B | * | 9/2021 | H04B 10/2971 |
| DE | 3817169 | A1 | * | 11/1989 | G01S 17/66 |
| WO | WO-2020238503 | A1 | * | 12/2020 | H04J 14/0275 |

* cited by examiner

METHOD FOR CORRECTING ORBIT ERROR OF COMMON-VIEW TIME COMPARISON OF SPACE STATION

CROSS-REFERENCE TO RELATED APPLICATION

This patent application is a national stage of International Application No. PCT/CN2022/119617, filed on Sep. 19, 2022, which claims priority to Chinese Patent Application No. 202111200206.5 filed with the China National Intellectual Property Administration on Oct. 14, 2021. Both of the aforementioned applications are incorporated by reference herein their entireties.

TECHNICAL FIELD

The present disclosure relates to a method for correcting an orbit error.

BACKGROUND

In 2021, China completed the launch and on-orbit test verification of Tianhe Core Module of the space station, and astronauts entered the core module to carry out space life and scientific experiments for a long time. Subsequently, China will launch two lab modules again to build a space laboratory together with the core module. In the lab module, a high-precision time-frequency lab cabinet will be equipped with a high-performance optical atomic clock system to generate ultra-high-performance time-frequency signals with second-order stability of $10^{-15}$ and daily stability of $10^{-18}$.

The European Space Agency is also implementing the Atomic Clock Ensemble in Space (ACES) project based on an International Space Station (ISS), which will carry a laser cold atomic cesium clock and an active hydrogen clock, and use the microgravity environment of the International Space Station to carry out microwave atomic clock experiments.

Therefore, not only China's space station, but also Europe's International Space Station will become high-performance time sources for space movement. Combined with the microwave communication link to earth between the two space stations, the space station can be regarded as a reference source for common-view time comparison, so as to carry out high-precision time comparison between the two observation stations.

Combined with the microwave link signal design system of the space station, and assisted by a high-precision atmospheric sounding device, the correction precision of atmospheric delay and relativistic influence can reach tens of picoseconds or even picoseconds, and the orbit error of the space station will be a primary factor limiting the precision of common-view time comparison. Due to the low orbital altitude of the space station, which is only a few hundred kilometers away from the ground, the influence of the orbital error on the common-view time comparison will be amplified when the baseline of the common-view time comparison is longer than the orbital altitude. Theoretical research and simulation analysis show that the maximum impact of the orbit error of 300 picoseconds on the common-view time comparison of the space station will reach about 700 picoseconds.

In order to achieve more accurate common-view time comparison, it is necessary to find a suitable method of correcting the orbit error of the space station, overcome the amplification of the orbit error resulted from low-orbit characteristics, and control the influence of post-event precision orbit error on common-view time comparison within 300 picoseconds.

SUMMARY

In order to overcome the deficiency of the amplification effect of the orbit error of the space station resulted from the low orbit characteristics in the prior art, the present disclosure provides a method for correcting an orbit error of common-view time comparison of a space station, finds an observation point with high spatial correlation of the orbit error of the two stations, limits the influence of the post-event precision orbit error on the common-view time comparison to be within 300 picoseconds, and can further reduce the influence of the orbit error for some observation stations with good observation conditions. This method is not only suitable for real-time common-view time comparison of the space station, but also suitable for batch processing of post-event common-view time comparison data. The real-time and post-event data processing methods are the same. The post-event data processing can use a precision orbit, and the absolute value of the precision orbit error is less than 0.1 m. The performance of common-view time comparison is higher.

The technical solution used by the present disclosure to solve the technical problems includes the following steps:

1) calculating elevation angles El and azimuth angles Az of two ground observation stations A and B according to orbit data of the space station;
2) determining whether two observation stations are able to simultaneously view the space station according to the elevation angles, if the elevation angles of two observation stations at a same moment are both greater than 0 degrees, considering that the two observation stations at the moment are able to simultaneously view the space station, and proceeding to Step 3), otherwise, returning to Step 1) to calculate elevation angles El and azimuth angles Az of the two ground observation stations at a next moment;
3) calculating projection coefficients X_coef, Y_coef and Z_coef of a three-dimensional orbit error in line-of-sight directions of the two observation stations;
4) calculating differences $X_{A\_}coef-X_{B\_}coef$, $Y_{A\_}coef-Y_{B\_}coef$ and $Z_{A\_}coef-Z_{B\_}coef$ of projection coefficients in respective error dimensions of the two observation stations, where subscripts represent the ground observation stations A and B;
5) calculating orbit error vectors with absolute values less than an absolute value of a post-event precision orbit error step by step with a set step value in X-axis, Y-axis and Z-axis directions, respectively, to obtain a three-dimensional orbit error vector set {Oex, Oey, Oez} of the space station;
6) calculating a set of projection differences of the orbit error in the line-of-sight directions of the two observation stations based on calculation results of the Steps 4) and 5);
7) calculating a maximum value $\Delta E_{max}$ of absolute values in the set of projection differences based on calculation result of the Step 6);
8) setting a decision threshold, and screening out an observation point with a projection difference less than the decision threshold, to obtain observation moments with high spatial correlation of the orbit error of the two observation stations, and performing common-view time comparison calculation at the observation moments to obtain a common-view time comparison result of the space station.

X_coef=(sin El cos $B_p$ cos $L_p$−cos El sin Az sin $L_p$−cos El cos Az sin $B_p$ cos $L_p$), Y_coef=(cos El sin Az cos $L_p$−cos El cos Az sin $B_p$ sin $L_p$+sin El cos $B_p$ sin $L_p$), Z_coef=(cos El cos Az cos $B_p$+sin El sin $B_p$), where $L_p$ and $B_p$ are a geodetic longitude and a geodetic latitude of each ground observation station, respectively.

In the Step (5), the orbit error is divided into three-dimensional error vectors in ECEF coordinates, and orbit error components Oex, Oey, Oez of the X-axis, the Y-axis and the Z-axis are all located in an interval of [−0.1, 0.1] meters, orbit error sets {Oex}, {Oey}, {Oez} of the X-axis, the Y-axis and the Z-axis are obtained in a step length of 0.01 m, data in the orbit error sets of the X-axis, the Y-axis and the Z-axis are arbitrarily combined, and orbit errors are further screened based on a decision condition $\sqrt{Oex^2+Oey^2+Oez^2}<0.1$ m to obtain a possible orbit error vector set.

In the Step (7), a projection difference of the orbit error in the line-of-sight directions of the two observation stations is $$L_1 - L_2 = Oex(X_{A\_coef} - X_{B\_coef}) + Oey(Y_{A\_coef} - Y_{B\_coef}) + Oez(Z_{A\_coef} - Z_{B\_coef}).$$

In the Step (8), a decision threshold of 250 picoseconds is used for unobstructed observation stations, and a decision threshold of 300 picoseconds is used for obstructed observation stations.

The present disclosure is applied to the correction of the orbit error of common-view time comparison based on the space station and a plurality of ground observation stations.

The method has the following beneficial effects. The amplification effect of the orbit error of the common-view time comparison resulted from the low-orbit characteristics of the space station is overcome by finding the observation moment with high spatial correlation of the orbit error of the two observation stations. The orbit error is corrected by combining the principle of common-view time comparison, and the correction precision is better than 300 picoseconds. The present disclosure reduces the influence of the orbit error on the common-view time comparison of the space station by about 400 picoseconds, and can promote the engineering application of the space station in the field of high-precision common-view time comparison.

DETAILED DESCRIPTION OF THE EMBODIMENTS

Figure 1:
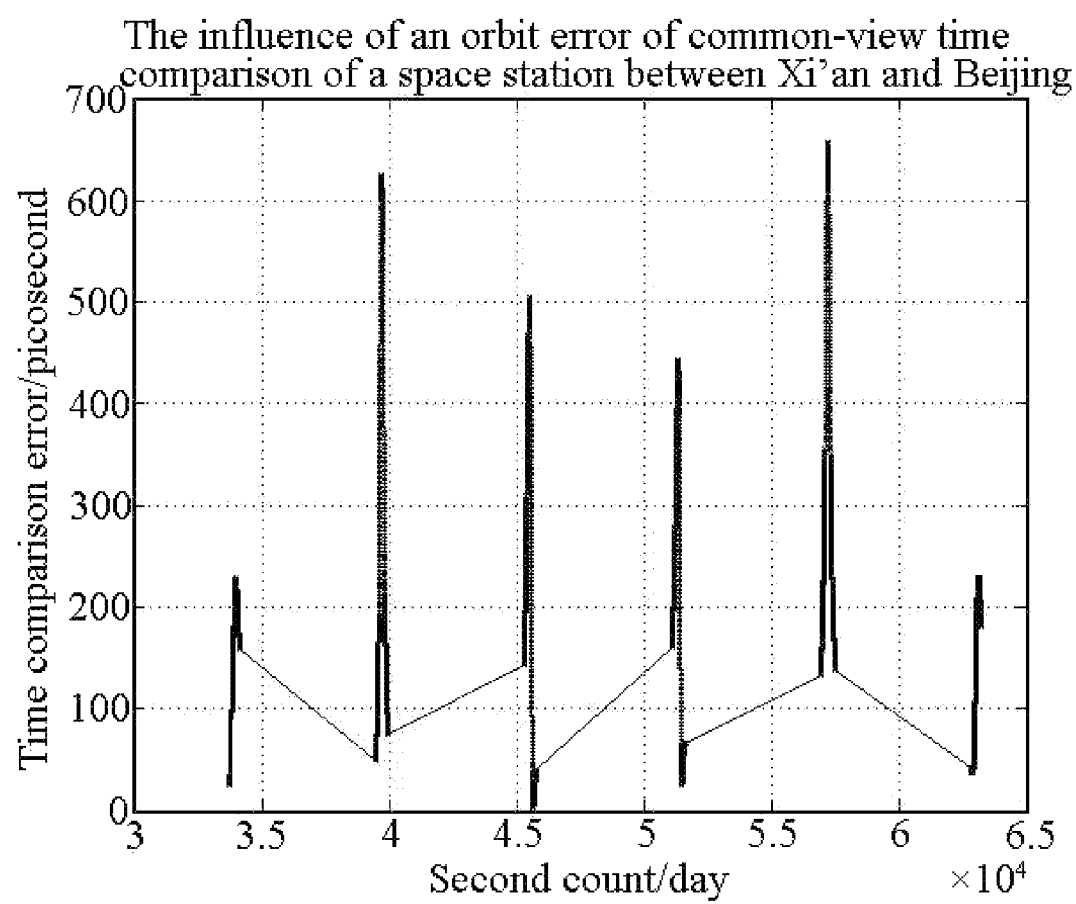
FIG. 1 is a simulation diagram of the influence of an orbit error of an original space station on common-view time comparison.
Figure 2:
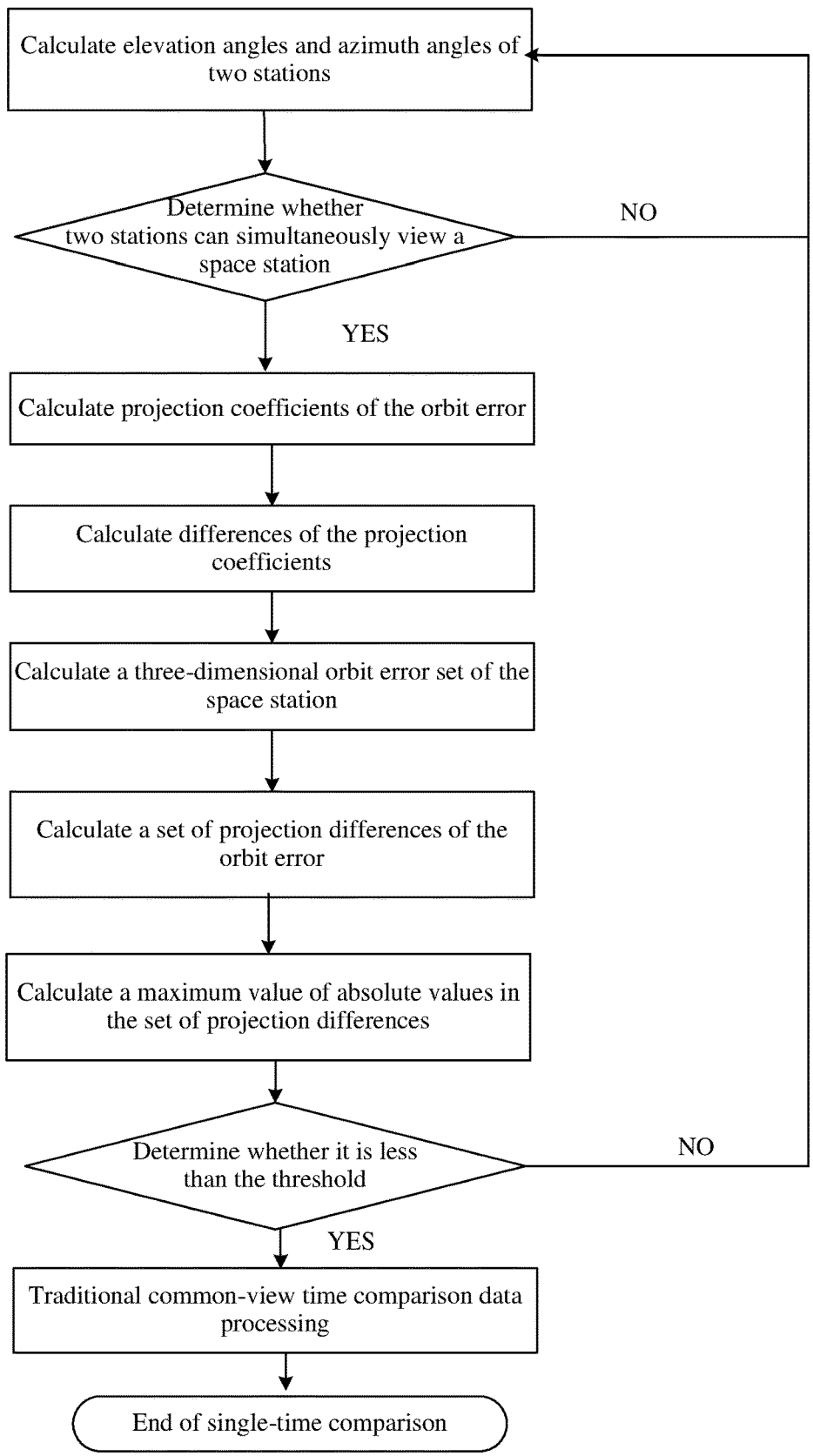
FIG. 2 is a flowchart of the correction of the orbit error of the space station.
Figure 3:
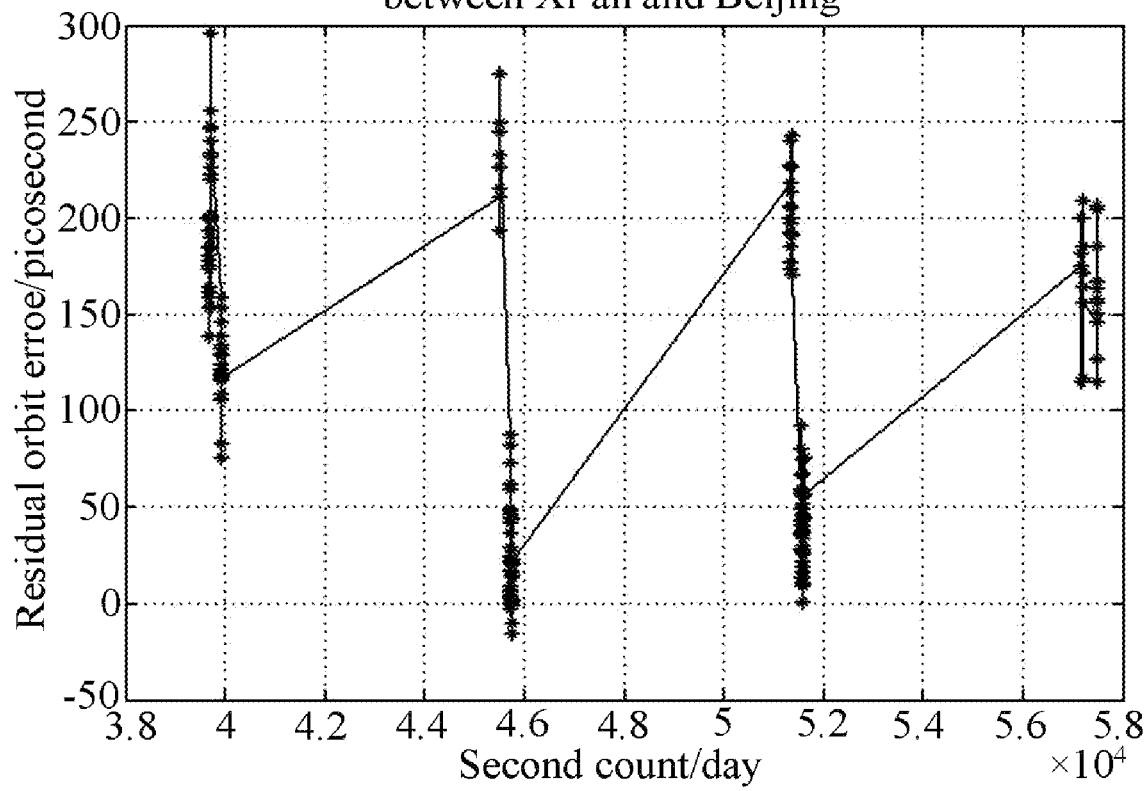
FIG. 3 is a diagram showing the effect of the correction of an orbit error of common-view time comparison between Xi'an and Beijing.
Figure 4:
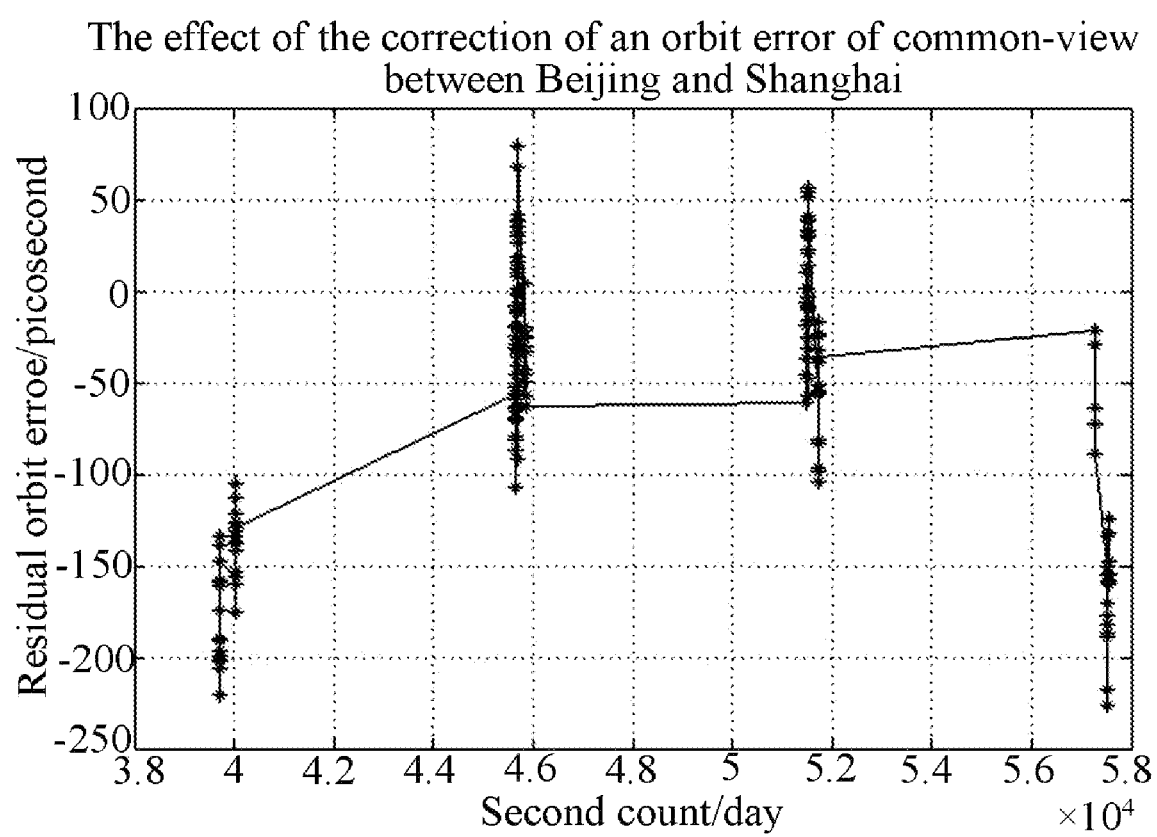
FIG. 4 is a diagram showing the effect of the correction of an orbit error of common-view time comparison between Beijing and Shanghai.

The present disclosure will be further described with reference to the attached drawings and embodiments, including but not limited to the following embodiments.

Taking the post-event calculation of the common-view time comparison of the space station based on two ground stations A and B as an example, the present disclosure includes the following steps 1)-8).

In step 1), according to orbit data of the space station, elevation angles El and azimuth angles Az of two ground observation stations are calculated.

In step 2), it is determined whether the two observation stations are able to simultaneously view the space station according to the elevation angles, and if the elevation angles of the two stations at the same moment are both greater than 0 degree, the two stations at this moment are able to simultaneously view the space station.

In step 3), when the two stations are able to simultaneously view the space station, projection coefficients of the three-dimensional orbit error in the line-of-sight directions of the two observation stations are calculated. Taking the X-axis, Y-axis and Z-axis orbit errors in ECEF coordinates as examples, projection coefficients of the X-axis orbit error in the line-of-sight directions of two stations are calculated by X_coef= (sin El cos $B_p$ cos $L_p$−cos El sin Az sin $L_p$−cos El cos Az sin $B_p$ cos $L_p$), the projection coefficients of the Y-axis orbit error in the line-of-sight directions of two stations are calculated by Y_coef=(cos El sin Az cos $L_p$−cos El cos Az sin $B_p$ sin $L_p$+sin El cos $B_p$ sin $L_p$), the projection coefficients of the Z-axis orbit error in the line-of-sight directions of two stations are calculated by Z_coef=(cos El cos Az cos $B_p$+sin El sin $B_p$), and in these three formulas, $L_p$ and $B_p$ are the geodetic longitude and latitude of the ground station, respectively.

In step 4), differences $X_{A\_coef}-X_{B\_coef}$ $Y_{A\_coef}-Y_{B\_coef}$ and $Z_{A\_coef}-Z_{B\_coef}$ of the projection coefficients in respective error dimensions of the two observation stations are calculated.

In step 5), a three-dimensional orbit error vector set of the space station is calculated, in which the absolute value of the post-event precision orbit error is less than 0.1 m, Taking the orbital errors of the X-axis, the Y-axis and the Z-axis in ECEF coordinates as an example, a set of orbital error vectors with the absolute values less than 0.1 m is calculated in a step length of 0.01 m for the X-axis, the Y-axis and the Z-axis.

In step 6), based on calculation results of the steps 4) and 5), a set of projection differences of the orbit error in the line-of-sight directions of the two stations is calculated.

In step 7), based on calculation result of the Step 6), a maximum value $\Delta E_{max}$ of the absolute values in the set of projection difference is calculated.

In step 8), a decision threshold is set, and an observation point with a projection difference less than the threshold is screened out. For the comparison between observation stations with good observation conditions, generally a threshold of 250 picoseconds is used, and the influence of the orbit error on the common-view time comparison can be controlled within 250 picoseconds. For obstructed observation stations, the threshold can also be adjusted according to the actual situation, such as amplifying the threshold to 300 picoseconds. At those observation points that meet the decision condition, the spatial correlation of the orbit error is high, and the influence of the orbit error on common-view time comparison is limited below the threshold.

After the above steps are completed, the observation moments with high spatial correlation of the orbital errors of the two observation stations are screened out, and the traditional common-view time comparison calculation is performed at these observation moments, so that the results of the common-view time comparison of the space station in which the influence of the orbital errors is less than the decision threshold can be obtained.

The embodiment of the present disclosure includes the following nine steps 1-9.

In Step 1, the ECEF coordinates, the geodetic longitude $L_p$ and latitude $B_p$ of two ground observation stations are obtained.

In Step 2, based on the post-event precision orbit data of the space station and the ECEF coordinates of the two ground observation stations, elevation angles El and azimuth angles Az of two stations are calculated.

In Step 3, the elevation angles of the two stations are determined. If the elevation angles of the two stations at the same moment are both greater than 0 degrees, it is considered that the two stations at this moment are able to simultaneously view space station, and the subsequent common-view time comparison calculation is carried out. If the simultaneous viewable condition is not satisfied, the process returns to Step 1. The elevation angles and the azimuth angles at the next moment are calculated, and viewable determination is made again.

In Step 4, the projection coefficients of the X-axis orbit error in the line-of-sight directions of two stations are calculated by X_coef=(sin El cos $B_p$ cos $L_p$–cos El sin Az sin $L_p$–cos El cos Az sin $B_p$ cos $L_p$), the projection coefficients of the Y-axis orbit error in the line-of-sight directions of two stations are calculated by Y_coef= (cos El sin Az cos $L_p$–cos El cos Az sin $B_p$ sin $L_p$+sin El cos $B_p$ sin L), and the projection coefficients of the Z-axis orbit error in the line-of-sight directions of two stations are calculated by Z_coef=(cos El cos Az cos $B_p$+sin El sin $B_p$).

In Step 5, differences $X_{A\_}$coef–$X_{B\_}$coef $Y_{A\_}$coef–$Y_{B\_}$coef and $Z_{A\_}$coef–$Z_{B\_}$coef of the projection coefficients are calculated based on the calculation result of Step 4, in which subscripts A and B are used to distinguish the two ground observation stations.

In Step 6, the three-dimensional orbit error vector set {Oex, Oey, Oez} of the space station is calculated. Since the absolute value of the post-event precision orbit error is less than 0.1 m, the orbit error is divided into three-dimensional error vectors in ECEF coordinates. Orbit error components Oex, Oey, Oez of the X-axis, the Y-axis and the Z-axis are all located in the interval of [−0.1, 0.1] meters. Orbit error sets {Oex}, {Oey}, {Oez} of the X-axis, the Y-axis and the Z-axis are obtained in a step length of 0.01 m. The data in the orbit error sets of the X-axis, the Y-axis and the Z-axis are arbitrarily combined, and orbit errors are further screened based on a decision condition $\sqrt{Oex^2+Oey^2+Oez^2}<0.1$ m to obtain a possible orbit error vector set.

In Step 7, based on calculation results of the Steps 5) and 6), a set of projection differences {$L_1$–$L_2$} of the orbit error in the line-of-sight directions of the two stations is calculated by using a formula $$L_1 - L_2 = Oex(X_{A\_}\text{coef}-X_{B\_}\text{coef}) + Oey(Y_{A\_}\text{coef}-Y_{B\_}\text{coef}) + Oez(Z_{A\_}\text{coef}-Z_{B\_}\text{coef}).$$

In Step 8, a maximum value $\Delta E_{max}$ of the absolute value in the set of projection differences {$L_1$–$L_2$} is calculated.

In Step 9, the decision threshold is set to 300 picoseconds, and determination is made by using the conditional relation $\Delta E_{max}<300$ picoseconds to screen out an observation point with a projection difference less than 300 picoseconds.

Through the above implementation steps, the observation moments with strong spatial correlation of the orbit error between the two observation stations are found. At these observation moments, the influence of the orbit error on common-view time comparison is not amplified, and even reduced to a certain extent due to the principle of common-view time comparison, which can improve the precision of time comparison. After the Step 9 is completed, the conventional common-view time comparison calculation can be carried out.

As can be seen from the above implementation steps, the implementation process of the method for correcting the orbit error of common-view time comparison of the space station proposed by the present disclosure mainly includes five parts, namely, determination of moments when two stations can simultaneously view the space station, calculation of projection coefficients of the orbit error, calculation of a three-dimensional orbit error vector set, calculation of a set of projection differences of the orbit error in line-of-sight directions of the two stations, and threshold decision. The core of the present disclosure is as follows. Through the calculation of the five parts, a maximum influence of the orbit error on a common-view time comparison result is obtained, an observation moment with the maximum influence exceeding a decision threshold is eliminated, and an observation point with the influence of the orbit error on the common-view time comparison less than the decision threshold is reserved.

As can be seen from the above embodiments, the main feature of the present disclosure is to find an observation moment with high spatial correlation of the orbit error of the space station between the two observation stations through the calculation and determination of the projection difference of the orbit error. At these observation moments, the orbit error will not be amplified or even weakened due to the difference principle of common-view time comparison. The present disclosure overcomes an amplification effect of the orbit error of the space station on the common-view time comparison, reduces the influence of the orbit error from 700 picoseconds to be less than 300 picoseconds, and greatly improves the precision of the common-view time comparison of the space station.

What is claimed is:

1. A method for correcting an orbit error of common-view time comparison of a space station, comprising following steps:
   1) calculating elevation angles El and azimuth angles Az of two ground observation stations A and B according to orbit data of the space station;
   2) determining whether two observation stations are able to simultaneously view the space station according to the elevation angles, if the elevation angles of two observation stations at a same moment are both greater than 0 degrees, considering that the two observation stations at the moment are able to simultaneously view the space station, and proceeding to Step 3), otherwise, returning to Step 1) to calculate elevation angles El and azimuth angles Az of the two ground observation stations at a next moment;

3) calculating projection coefficients X_coef, Y_coef and Z_coef of a three-dimensional orbit error in line-of-sight directions of the two observation stations;
4) calculating differences $X_{A\_}\text{coef}-X_{B\_}\text{coef}$, $Y_{A\_}\text{coef}-Y_{B\_}\text{coef}$ and $Z_{A\_}\text{coef}-Z_{B\_}\text{coef}$ of projection coefficients in respective error dimensions of the two observation stations, wherein subscripts represent the two ground observation stations A and B;
5) calculating orbit error vectors with absolute values less than an absolute value of a post-event precision orbit error step by step with a predetermined step value in X-axis, Y-axis and Z-axis directions, respectively, to obtain a three-dimensional orbit error vector set {Oex, Oey, Oez} of the space station;
6) calculating a set of projection differences of the orbit error in the line-of-sight directions of the two observation stations based on calculation results of the Steps 4) and 5);
7) calculating a maximum value $\Delta E_{max}$ of absolute values in the set of projection differences based on calculation result of the Step 6);
8) setting a decision threshold, and screening out an observation point with a projection difference less than the decision threshold, to obtain observation moments with high spatial correlation of the orbit error of the two observation stations; and
9) communicating, to a second ground observation station of the two ground observation stations, a first information about a first time signal from an atomic clock in a first ground observation station of the two ground observation stations and a first time-frequency signal that is obtained through observing an atomic clock in the space station by the first ground observation station at one observation moment of the observation moments and received by the first ground observation station via a microwave communication link to earth; communicating, to the first ground observation station, a second information about a second time signal from an atomic clock in the second ground observation station and a second time-frequency signal that is obtained through observing the atomic clock in the space station by the second ground observation station at the one observation moment and received by the second ground observation station via the microwave communication link to earth; and performing common-view time comparison calculation based on the first information and the second information by the first ground observation station and the second ground observation station.

2. The method according to claim 1, wherein
X_coef=(sin El cos $B_p$ cos $L_p$−cos El sin Az sin $L_p$−cos El cos Az sin $B_p$ cos $L_p$),
Y_coef=(cos El sin Az cos $L_p$−cos El cos Az sin $B_p$ sin $L_p$+sin El cos $B_p$ sin $L_p$),
Z_coef=(cos El cos Az cos $B_p$+sin El sin $B_p$), wherein $L_p$ and $B_p$ are a geodetic longitude and a geodetic latitude of each of the two ground observation stations, respectively.

3. The method according to claim 1, wherein in the Step (5), the orbit error is divided into three-dimensional error vectors in ECEF coordinates, and orbit error components Oex, Oey, Oez of the X-axis, the Y-axis and the Z-axis are all located in an interval of [−0.1, 0.1] meters, orbit error sets {Oex}, {Oey}, {Oez} of the X-axis, the Y-axis and the Z-axis are obtained in a step length of 0.01 m, data in the orbit error sets of the X-axis, the Y-axis and the Z-axis are arbitrarily combined, and orbit errors are further screened based on a decision condition $\sqrt{Oex^2+Oey^2+Oez^2}<0.1$ m to obtain a possible orbit error vector set.

4. The method according to claim 1, wherein in the Step (7), a projection difference of the orbit error in the line-of-sight directions of the two ground observation stations is $$L_1 - L_2 = Oex(X_{A\_}\text{coef}-X_{B\_}\text{coef}) + Oey(Y_{A\_}\text{coef}-Y_{B\_}\text{coef}) + Oez(Z_{A\_}\text{coef}-Z_{B\_}\text{coef}).$$

5. The method according to claim 1, wherein in the Step (8), a decision threshold of 250 picoseconds is used for unobstructed observation stations, and a decision threshold of 300 picoseconds is used for obstructed observation stations.

6. The method according to claim 1, wherein the method is applied to correction of an orbit error of common-view time comparison based on a space station and a plurality of ground observation stations.

* * * * *